United States Patent [19]
Covington et al.

[11] Patent Number: 5,358,381
[45] Date of Patent: Oct. 25, 1994

[54] YOKE FOR HELICOPTER ROTOR SYSTEMS

[75] Inventors: Cecil E. Covington, Hurst; Timothy K. Ledbetter, Euless; Ernest A. Powell, Bedford; Madison K. Robinson, Bedford; Ajay Sehgal, Bedford; Patrick R. Tisdale, Roanoke, all of Tex.

[73] Assignee: Bell Helicopter Textron Inc., Fort Worth, Tex.

[21] Appl. No.: 34,345

[22] Filed: Mar. 19, 1993

[51] Int. Cl.⁵ .............................................. B64C 27/38
[52] U.S. Cl. .............................................. 416/134 A
[58] Field of Search ........... 416/134 A, 136 A, 140 A

[56] References Cited

U.S. PATENT DOCUMENTS

| | | | |
|---|---|---|---|
| 3,261,407 | 7/1966 | Culver et al. | 416/134 A |
| 3,519,260 | 7/1970 | Irwin | 416/134 A |
| 4,352,631 | 10/1982 | Buchs et al. | 416/134 A |
| 4,650,401 | 3/1987 | Yao et al. | 416/134 A |
| 4,892,461 | 1/1990 | Matsumoto et al. | 416/134 A |
| 4,898,515 | 2/1990 | Beno et al. | 416/134 A |

*Primary Examiner*—Edward K. Look
*Assistant Examiner*—Mark Sgantzos

*Attorney, Agent, or Firm*—John M. Cone; William L. Clayborn

[57] ABSTRACT

An improved feathering flexure for a helicopter rotor system yoke includes, in transverse cross section, a relatively thin central web and six relatively thin flanges. Three flanges extend from each of the web's two edges, and the flanges lie in planes which are approximately radial relative to the neutral feathering axis of the feathering flexure. The feathering flexure is constructed of fiberglass material embedded in a polymer matrix. The web's fiberglass material in the web is bias material, that is, material whose glass fibers are oriented at plus or minus 45 degrees relative to the yoke's spanwise axis. In transverse cross section, each of the flanges includes two unidirectional belts disposed on either side of a bias pack. The glass fibers in the unidirectional belts are oriented parallel to the yoke's spanwise axis. The fiberglass material in the bias packs is bias material. Each flange's unidirectional belts taper inwardly toward its bias pack adjacent to web, thereby decreasing the thickness of the flange adjacent to the web. In addition, the portion of each flange adjacent to the web is configured to minimize torsional rigidity and shear stress resulting from twisting the feathering flexure.

3 Claims, 4 Drawing Sheets

YOKE FOR HELICOPTER ROTOR SYSTEMS

BACKGROUND OF THE INVENTION

The present invention relates to helicopter rotor systems. More particularly, the invention relates to a yoke for connecting a helicopter's rotor blades to the helicopter's rotor hub.

Yokes constructed of composite materials are known in the art. Examples of such yokes are described in U.S. Pat. No. 4,427,340 (Metzger et al.) and U.S. Pat. No. 4,650,401 (Yao et al.).

Each of the cited patents discloses a yoke that is constructed of conventional fiberglass materials in a polymer matrix. In each, a majority of the yoke structure comprises a unidirectional material in which all fibers are oriented in a spanwise, or longitudinal direction. This provides a structure with very high longitudinal strength to transmit high centrifugal forces from the rotor blades to the rotor mast, where the centrifugal forces balance each other.

Each yoke includes an arm for each rotor blade, and each arm includes a flapping flexure and feathering flexure. The flapping flexure accommodates most of the bending which results from rotor blade motion perpendicular to the rotor blade's plane of rotation ("flapping" motion). The feathering flexure accommodates most of the bending which results from rotor blade motion in the rotor blade's plane of rotation ("lead-lag" motion).

Control movements are transmitted to each rotor blade by a cuff. The cuff acts to rotate the rotor blade about its longitudinal, or spanwise axis, thereby changing its pitch, or "feathering" it. Rotor blade torsion loads are transmitted to the control system through the cuff.

The cuff's outboard end is rigidly attached to the inboard end of the rotor blade and its inboard end is connected to the yoke by a pair of elastomeric lead-lag dampers and an elastomeric shear restraint, or snubber. As explained in connection with FIG. 13 of Metzger, the cuff is more rigid than the feathering flexure in the lead-lag direction. As a result, when the feathering flexure is bent due to blade lead-lag motion, the lead-lag dampers are linearly deformed, thereby damping the blade's lead-lag motion. Such damping is necessary to prevent rotor blade instability due to ground and air resonance.

The feathering flexure's requirements are the most complex and difficult to fulfill:

1. It must be extremely strong in the spanwise direction to react rotor blade centrifugal force;
2. It must be sufficiently rigid in the flapping direction to transmit flapping bending moments to the flapping flexure while not itself being bent significantly;
3. It must have less lead-lag rigidity than the cuff so that lead-lag bending causes relative motion between itself and the cuff, thereby deforming, or "working" the lead-lag dampers, but it must have sufficient lead-lag rigidity to ensure that the deformation of the dampers is substantially linear, not rotary;
4. It must have sufficient lead-lag shear strength to react the shear stresses which result from the relative motion between itself and the cuff;
5. It should be torsionally flexible to minimize rotor blade control force;.
6. It must have sufficient torsional shear strength to react the shear stresses which result from twisting it to feather the rotor blade;
7. Its lead-lag rigidity must be such that the natural frequency of the yoke-cuff-rotor blade combination is about 65-70 percent of the normal operating RPM of the combination; and
8. It should be relatively easy to fabricate using conventional composite layup and curing processes.

A feathering flexure's success in fulfilling the foregoing requirements depends largely on the geometry of its transverse cross section and the mechanical properties of the materials used in its construction.

The feathering flexure of the Metzger yoke develops relatively high shear stresses when twisted and is difficult to fabricate. Because of the relatively high shear stresses, the feathering flexure must be relatively long in order to provide the necessary pitch range without exceeding its shear strength.

The high shear stresses result from bending the feathering flexure's ribs 40, 42, 44 and 46 (Metzger FIG. 5) edgewise (parallel to their longer cross-sectional dimension) when the flexure is twisted. In addition, the intersections of the ribs 40, 42, 44, and 46 with the web 112 develop high intersection shear stress (which is proportional to the largest circle that can be inscribed in an intersection), because the ribs 40, 42, 44, and 46 are relatively thick at the intersections. Finally, the sharp corners at the intersections act as stress raisers, decreasing the shear strength of the flexure.

The shape of the Metzger feathering flexure renders it difficult to fabricate using conventional processes. This is due to the height of the ribs 40, 42, 44, 46 and the fact that they are perpendicular to the web 112.

In the feathering flexure disclosed in Yao, all shear stress is reacted by the flexure's spanwise filaments 56 (Yao FIG. 3b). While such unidirectional material is very efficient in reacting tensile stress, it is relatively inefficient in reacting shear stress. For example, the shear strength of unidirectional fiberglass material is approximately 10,000 psi, while its tensile strength is approximately 200,000 psi, a ratio of 1 to 20. As the ratio of lead-lag shear stress to spanwise tensile stress typically exceeds 1 to 20, the amount of material used in the flexure's construction is dictated by its required shear strength, which results in more tensile strength than necessary. A flexure constructed to achieve adequate tensile strength and shear strength simultaneously would save the material weight "wasted" in providing the excess tensile strength of the Yao feathering flexure.

Twisting the Yao feathering flexure to feather its rotor blade bends the arms of the flexure flatwise (parallel to their shorter cross-sectional dimension), which develops shear stress. For a given flexure arm thickness (the flatwise dimension), the level of shear stress developed is dependent on the amount the flexure is twisted per unit of spanwise length; for a given pitch change, the longer the flexure, the lower the shear stress. Thus, for a given pitch range, a feathering flexure having higher shear strength than the Yao flexure could be shorter than the Yao flexure. Among other advantages, a shorter flexure would save weight and reduce aerodynamic drag.

SUMMARY OF THE INVENTION

The present invention is a feathering flexure for an integrated helicopter rotor system yoke. The described embodiment of the invention is constructed of glass fibers embedded in a polymer matrix.

The feathering flexure includes, in transverse cross section, a thin central web and six thin flanges. Three flanges extend from each of the web's two edges and the flanges lie in planes which are approximately radial relative to the web's neutral feathering axis.

Each flange includes a bias pack and two unidirectional belts. In transverse cross section, the unidirectional belts are disposed on opposing sides of the bias pack. The glass fibers in the bias packs, and those in the web, are oriented at plus or minus 45 degrees to the yoke's spanwise axis. The glass fibers in the unidirectional belts are oriented parallel to the yoke's spanwise axis.

In transverse cross section, the unidirectional belts of each flange taper inwardly toward the flange's bias pack adjacent to the intersection of the flange and the web, thereby decreasing the thickness of the flange at the intersection.

By reason of the materials used in the feathering flexure's construction, the balance between the flexure's spanwise tensile strength and its shear strength is superior to that of previous feathering flexures. By reason of the relatively thin web and flanges, the orientation of the flanges relative to the feathering flexure's neutral feathering axis, and the configuration of the flanges adjacent to web, the torsional rigidity of the flexure is minimized and the shear stress developed when the flexure is twisted is minimized. As a result, for a given level of tensile and shear strength and a given pitch range, the feathering flexure is shorter and lighter than was possible with previous flexures.

BRIEF DESCRIPTION OF THE DRAWINGS

An embodiment of the invention will be described, by way of example only, with reference to the accompanying drawings, in which.

DETAILED DESCRIPTION

Figure 1:
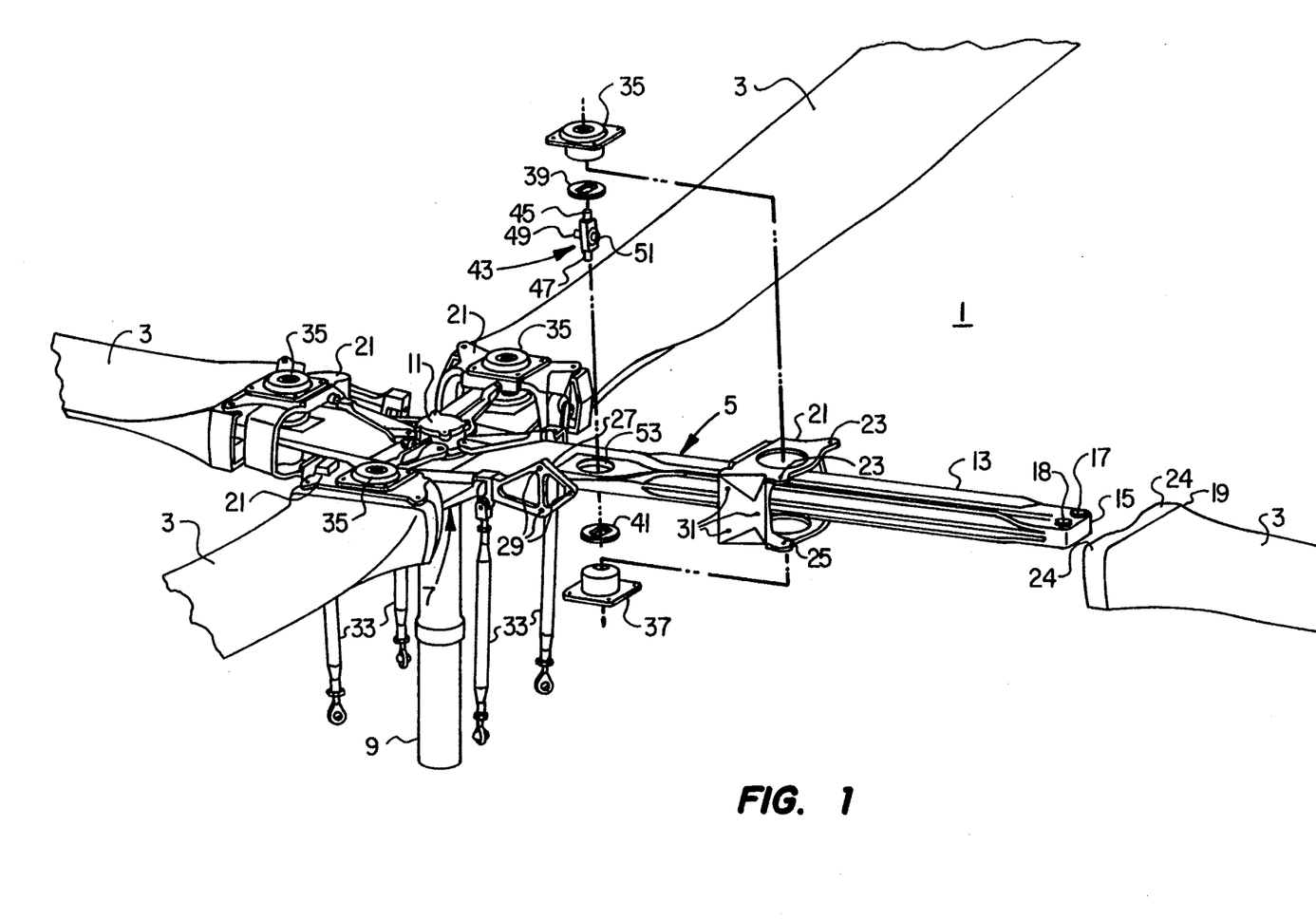
FIG. 1 is a partially-exploded perspective view of a helicopter rotor system having a yoke embodying the present invention.

FIG. 1 shows the center portion of a rotor system 1 for a four-bladed helicopter. Only the integral pitch cuffs 3 of the blades are shown.

An upper yoke 5 and a lower yoke 7 are mounted on the upper end of the helicopter's mast 9 by means of a drive plate 11 and a mast flange (not shown). The upper and lower yokes 5 and 7 are clamped between the mast flange and the drive plate 11 by eight bolts (not shown).

The upper and lower yokes 5 and 7 are identical, and each includes two identical arms 13. Each pitch cuff 3 and its integral blade (not shown) is attached to an outer end 15 of a respective yoke arm 13 by two bolts (not shown), each of which passes through a respective bushing 17 and 18 near the outboard end 15 of the yoke arm 13. An inner end 19 of each pitch cuff 3 is attached to a respective housing 21 by means of two bolts (not shown), each of which passes through an upper hole 23 in the housing 21, an upper hole 24 in the pitch cuff 3, a spacer bushing (not shown), a lower hole (not shown) in the pitch cuff 3, and a lower hole 25 in the housing 21.

Each housing 21 is attached to a respective pitch horn 27 by means of three bolts (not shown) which pass through holes 29 in the pitch horn 27 and holes 31 in the housing 21. The pitch horns 27 are connected to a conventional swash plate assembly (not shown) by pitch links 33.

Each housing 21 is connected to a respective yoke arm 13 by means of a damper/shear restraint assembly. Each damper/shear restraint assembly comprises an upper lead-lag damper 35, a lower lead-lag damper 37, an upper restraint mount 39, a lower restraint mount 41, and an elastomeric shear restraint 43.

The upper and lower dampers 35 and 37 are attached to the housing 21 by four bolts each. The upper damper 35 is attached to the shear restraint 43 by a threaded upper shear restraint shaft 45, which passes through a hole (not shown) in the center of the upper damper 35. The lower damper 37 is attached to the shear restraint 43 by a threaded lower shear restraint shaft 47, which passes through a hole (not shown) in the center of the lower damper 37.

The shear restraint 43 is connected to the arm 13 by the upper and lower restraint mounts 39 and 41. An inner shear restraint shaft 49 and an outer shear restraint shaft 51 engage semi-cylindrical grooves in the inner faces of the upper and lower restraint mounts 39 and 41 and are clamped therebetween. The shear restraint 43 is mounted in an aperture 53 in the arm 13, and the upper and lower restraint mounts 39 and 41 are clamped to the arm 13 using four bolts (not shown). Thus, when assembled, the shear restraint 43 is connected to the arm 13 and is centered in the aperture 53 with its inner and outer shafts 49 and 51 aligned with the arm's spanwise axis.

Figure 2:
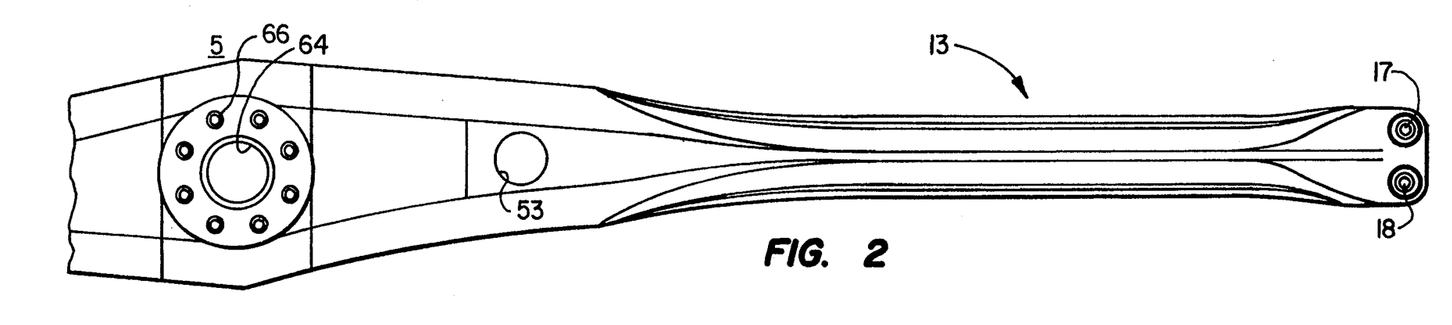
FIG. 2 is a top view of a portion of the yoke of FIG. 1.
Figure 3:
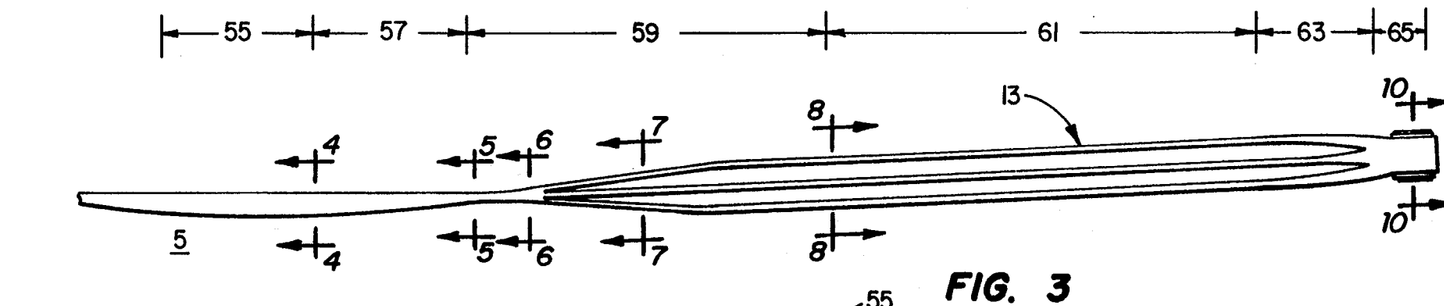
FIG. 3 is a side view of the yoke of FIG. 2.

FIGS. 2 and 3 show partial top and side views, respectively, of the yoke 5 (or 7). Only one of the yoke's arms 13 is shown in its entirety.

The yoke 5 comprises a centrally-located hub 55 and two integral arms 13. Each arm 13 comprises a flapping flexure 57, an inboard transition section 59, a feathering flexure 61, an outboard transition section 63, and an outboard joint 65. The integral pitch cuff/blade (not shown) is attached to the outboard joint. It is to be understood that the blade and the cuff can be separate structures. In that case, both the blade and the cuff 3 are attached to the outboard joint 65. Alternatively, the cuff 3 is attached to the outboard joint 65 and the blade (not shown) is attached to an outboard extension (not shown) of the cuff 3.

The hub 55 contains an aperture 64 through which the mast 9 (FIG. 1) passes. The hub also contains eight bolt holes 66 through which pass the bolts (not shown) which clamp the upper and lower yokes 5 and 7 between the drive plate 11 and the mast's flange (not shown).

Figure 4:
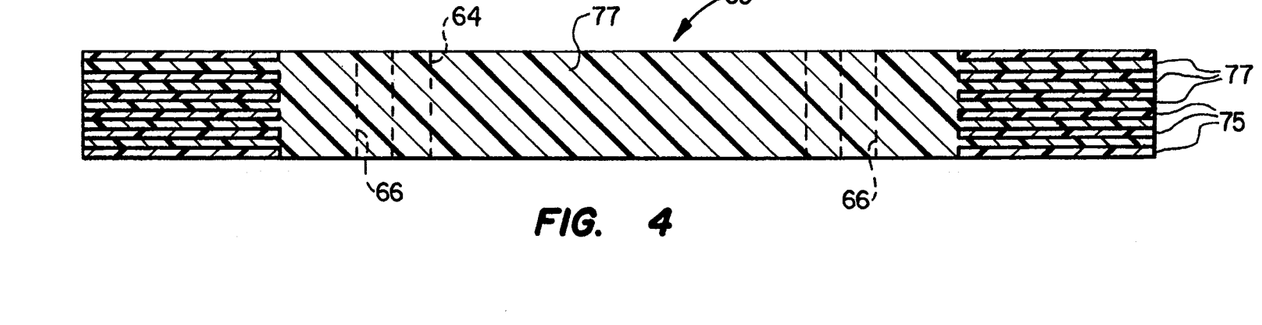
FIG. 4 is a cross-sectional view taken through plane 4—4 in FIG. 3.
Figure 5:
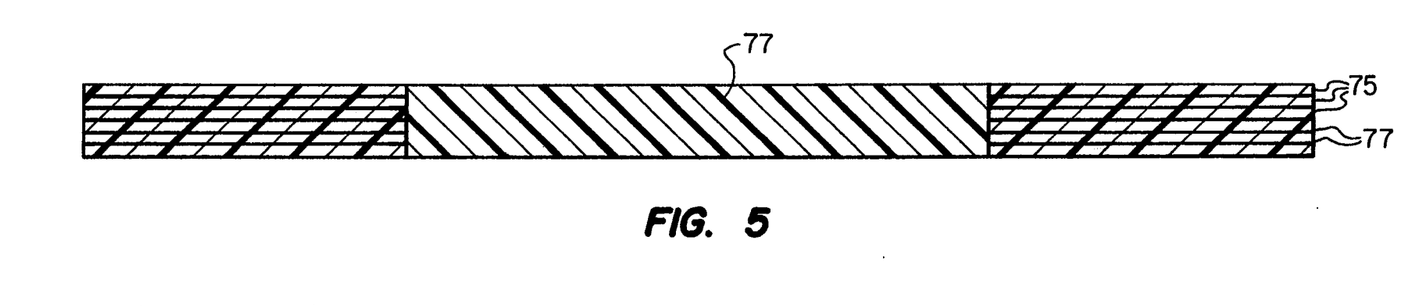
FIG. 5 is a cross-sectional view taken though plane 5—5 in FIG. 3.

The transverse cross section of the flapping flexure 57 begins as a wide, thick rectangle and tapers to a narrower, thinner rectangle (FIGS. 4 and 5). The transverse cross section of the flapping flexure 57 is tailored to ensure that its lead-lag rigidity is much greater, and its flapping rigidity much less, than that of the outboard portions of the arm 13. As a result, most bending due to rotor blade lead-lag motion takes place outboard of the flapping flexure 57 and most bending due to rotor blade flapping motion takes place in the flapping flexure 57.

Figure 6:
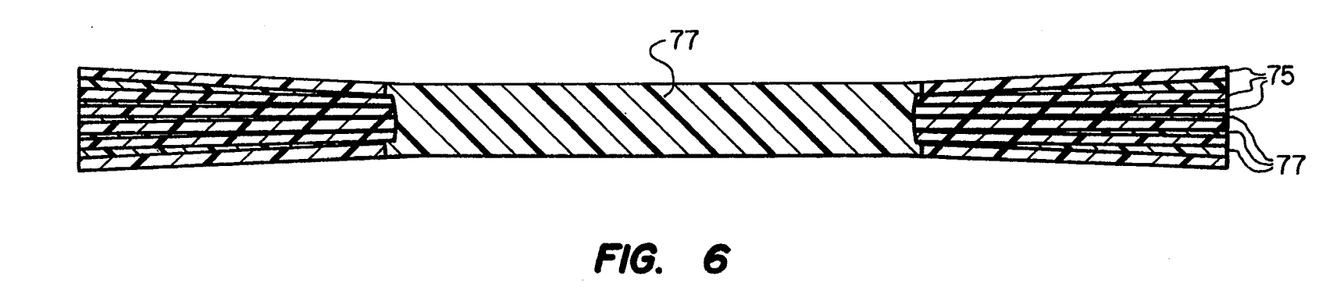
FIG. 6 is a cross-sectional view taken through plane 6—6 in FIG. 3.
Figure 7:
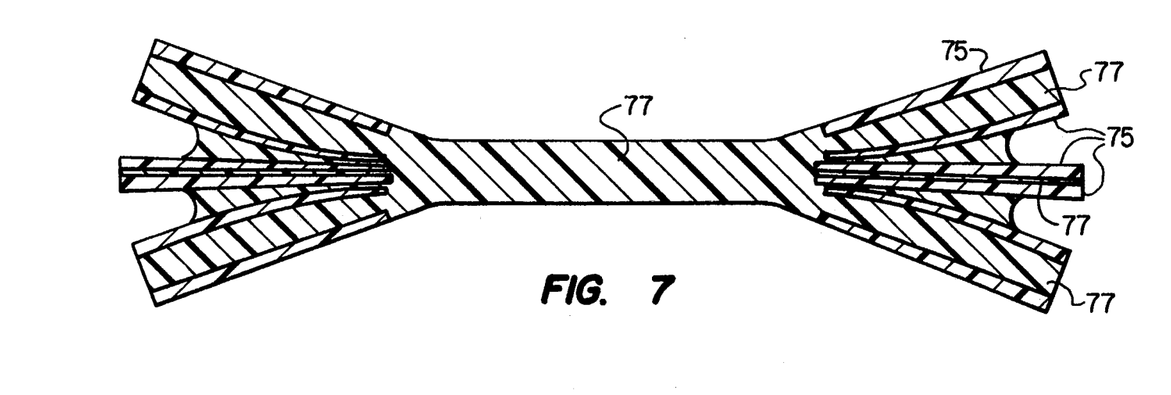
FIG. 7 is a cross-sectional view taken through plane 7—7 in FIG. 3.
Figure 8:
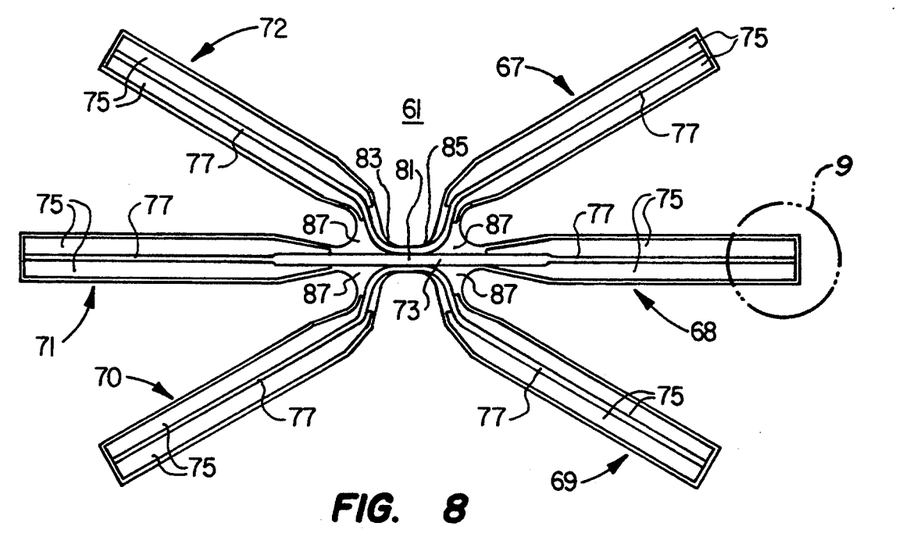
FIG. 8 is an enlarged cross-sectional view taken through plane 8—8 in FIG. 3.

In the inboard transition section 59, the transverse cross section of the arm 13 transitions to that of the feathering flexure 61 (FIGS. 6–8). The arm's transverse cross section is constant throughout the feathering flexure 61 (FIG. 8), then transitions to that of the outboard joint 65 (FIG. 10) in the outboard transition section 63.

Refer now to FIG. 8, which shows the transverse cross section of the feathering flexure 61. The view in FIG. 8 is enlarged relative to those shown in FIGS. 4–7 and 10. The feathering flexure 61 comprises six flanges 67–72 and a central web 73. In this embodiment of the invention, when the feathering flexure 61 is in the relaxed or untwisted position, flanges 68 and 71 and the web 73 lie in a plane which is parallel to the plane of the chord of the associated rotor blade (not shown).

In another embodiment, the feathering flexure 61 is pretwisted so that when the feathering flexure 61 is in the untwisted position, the associated rotor blade is at approximately the midpoint of its pitch range. As a result, the amount the feathering flexure 61 must be twisted to provide the required rotor blade pitch range is decreased, decreasing the maximum shear stress experienced by the feathering flexure. The pretwist is formed during the layup and molding process.

Figure 9:
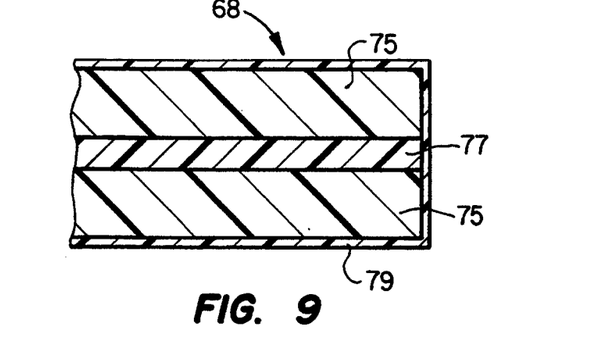
FIG. 9 is an enlarged cross-sectional view of area 9 in FIG. 8.

Refer now to FIG. 9, which shows an enlarged transverse cross-sectional view of the portion of the flange 68 designated 9 in FIG. 8. It is to be understood that the construction of flanges 67 and 69–72 is identical to that of the flange 68. The flange 68 includes two unidirectional belts 75 which are disposed on opposite sides of a bias pack 77. The unidirectional belts 75 are constructed of unidirectional fiberglass material whose fibers are parallel to the yoke's spanwise axis, thereby providing high tensile strength to react rotor blade centrifugal force. The bias pack 77 is constructed of four plies of ±45° fiberglass material ("bias material"), that is, material whose fibers are at an angle of plus or minus 45 degrees relative to the yoke's spanwise axis. A thin cover 79 of woven fiberglass material covers the outer surface of the flange 68. The cover 79 functions to prevent or localize spanwise cracks in the unidirectional belts 75.

The bias pack 77 serves three functions:
1. It increases the flexure's shear strength;
2. It separates the unidirectional belts 75 of the flange 68 so that any fracture in one of the belts 75 will be localized in that belt 75, rather than propagating through the entire flange 68, thereby preventing catastrophic failure of the flange 68; and
3. It attaches the flange 68 to the web 73, creating an integral section (FIG. 8).

The shear strength of the bias material is approximately 40,000 psi, approximately four times that of unidirectional material. The tensile strength of the bias material is also approximately 40,000 psi. It will be appreciated that for a given amount of fiberglass material, a flexure constructed of a combination of unidirectional material and a relatively small proportion of bias material will have a markedly higher shear strength than a flexure constructed solely of unidirectional material, while having only slightly less tensile strength. Thus, bias material can be used to tailor the feathering flexure's shear strength and tensile strength to achieve the desired tensile and shear strengths simultaneously, thereby minimizing the amount of material required.

Referring again to FIG. 8, the bias packs 77 of flanges 67 and 72 are constructed of four continuous plies of bias material. The same is true for the bias packs of flanges 68 and 71 and for those of flanges 69 and 70. The bias packs 77 of all the flanges 67–72 form the web 73. Thus, the web 73 includes twelve plies of bias material. The components of the bias packs 77 parallel to the rotor system's lead-lag plane function as a very efficient means for reacting lead-lag shear stress. In addition, the bias packs 77 provide an efficient means for reacting the shear stress which results from twisting the feathering flexure 61.

A thin flange that emanates radially from the neutral feathering axis 81 of the feathering flexure 61 offers little resistance to twisting and develops minimum stress when twisted. Flanges 68 and 71 are radial, while flanges 67, 69, 70, and 72 are only approximately radial. While flanges 67, 69, 70, and 72 being only approximately radial increases the torsional rigidity of the feathering flexure 61 and the shear stress developed when the feathering flexure 61 is twisted, those increases are minimal, and the configuration shown results in optimal lead-lag and flapping bending rigidity.

For a given amount of flange material and a given cross-sectional flange width, the greater the number of flanges, the thinner the flanges can be. However, if a flange is too thin, it can buckle when bent edgewise.

Increasing the number of flanges that meet at an intersection increases the size of the circle that can be inscribed in the intersection, thus increasing the intersection shear stress. The increased intersection shear stress, in combination with the other shear stresses to which the intersection is subjected, can exceed the shear strength of the intersection material, resulting in failure of the flexure at the intersection. Therefore, it is advantageous to provide more than one intersection, thereby decreasing the intersection shear stress at each intersection.

Finally, increasing the number of flanges and intersections in a flexure increases the difficulty of fabricating the flexure. The more complex the flexure's shape, the more difficult it is to fabricate.

In this embodiment of the invention, the feathering flexure 61 comprises six flanges 67–72 and two intersections 83 and 85. The flanges 67–72 are relatively thin, but sufficiently thick to avoid buckling when being bent edgewise. For the design tensile and shear loads, it was determined that two intersections is the best compromise between maximizing the number of intersections to minimize the intersection shear stress at each intersection and minimizing the number of intersections to simplify fabrication. Because the feathering flexure 61 is subjected to significantly higher lead-lag bending moments than flapping bending moments, the flanges 67–72 are oriented to provide relatively greater lead-lag bending rigidity. A further reason for the orientation of the flanges 67–72 is to provide substantial bias material in and parallel to the lead-lag plane to react the shear stress resulting from the interaction between the feathering flexure 61 and the pitch cuff 3 (FIG. 1).

The thickness of the unidirectional belts 75 decrease toward the intersections 83 and 85 of the flanges 67–72 and the web 73, so that only the bias packs 77 meet at the intersections 83 and 85. In addition, the bias packs 77 of flanges 68 and 71 intersect the web 73 at an angle of zero degrees, and the bias packs of flanges 67, 69, 70, and 72 intersect the web 73 a close as practical to an angle of 90 degrees. As a result of the decreased thickness of the flanges 67–72 at the intersections 83, 85 and the angles at which the flanges 67–72 intersect the web 73, the size of the circles that can be inscribed in the intersections 83, 85 is minimized, thus minimizing the intersection shear stress developed when the feathering flexure 61 is twisted. Additional unidirectional material is used to fill in a sharp, shear stress-raising area 87 on the side of each intersection 83 and 85 away from the web 73.

It will be appreciated that the combination of bias material, unidirectional material, thin flanges 67–72, and multiple flange intersections 83 and 85 optimally satisfies the somewhat conflicting requirements for the feathering flexure 61. The feathering flexure 61 provides the required spanwise strength and lead-lag and flapping rigidities. It provides relatively high lead-lag and torsional shear strength while developing relatively low shear stresses when twisted, allowing the flexure to accommodate a given pitch range in a shorter spanwise length than was possible with previous composite yokes. That, combined with the flexure's more efficient utilization of material, results in a lighter, more compact feathering flexure 61.

As mentioned above, the unidirectional belts 75 are constructed of unidirectional fiberglass material. Each belt 75 is laid up using thin, ⅛-inch wide, unidirectional fiberglass tape. Alternatively, any convenient width tape or a single glass fiber may be used. Beginning at a leading bushing 17 (FIG. 2) in the outboard joint 65 of one arm 13, the tape is laid along the spanwise length of the yoke 5 to a trailing bushing 18 in the outboard joint 65 of the yoke's other arm (not shown). The tape is wrapped around the trailing bushing 18, then laid back along the length of the yoke 13 to the original leading bushing 17. The tape is again wrapped around the leading bushing 17 and the process repeated until enough tape to form one unidirectional belt 75 has been laid up. The resulting long, racetrack-shaped member is then compacted to form the shape it will have upon curing. This requires that the fore and aft portions of the member be merged together in all areas of each arm 13, except for the outboard transition section 63 and the outboard joint 65.

The described layup process is repeated for each leading bushing 17/trailing bushing 18 pair. Thus, the leading bushing 17 of each arm 13 of the yoke 5 is connected to the trailing bushing 18 of the other arm (not shown) by six continuous lengths of unidirectional tape.

Figure 10:
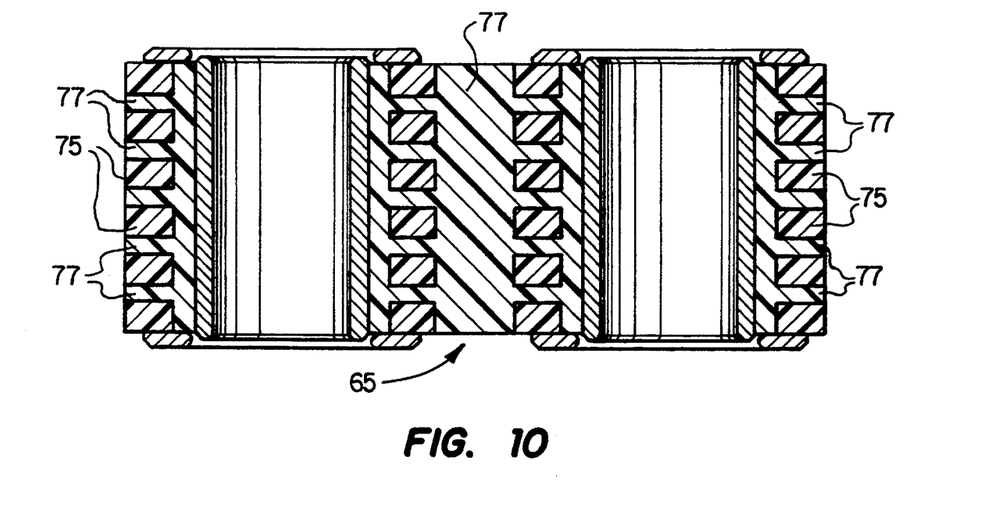
FIG. 10 is a cross-sectional view taken through plane 10—10 in FIG. 3.

The same number of unidirectional fibers are contained in each cross section of the yoke 5. The amount of bias material is varied along the spanwise length of the yoke 5 to increase or decrease the cross-sectional area as required. That variation includes varying the width of and number of plies in each bias pack 77, as well as inserting additional bias material between the unidirectional belts 75. For example, as shown in FIG. 10, the outboard joint 65 includes five bias packs 77, each of which is comprised of 13 or 14 plies of bias material. The details regarding the unidirectional and bias materials are omitted in FIGS. 4–7.

Although, this embodiment of the invention is constructed of fiberglass, it is to be understood that other high-strength fibers, such as carbon or boron, can be used.

The configuration of the feathering flexure 61 of this embodiment of the invention was determined to be optimal for the helicopter for which the yokes 5 and 7 are intended. It is to be understood that the optimal configuration will vary depending on the size of the helicopter, the number of blades, and the materials used to construct the yoke. In all cases, however, when compared to previous composite yokes, a yoke which includes a feathering flexure which incorporates the features described above will be a more efficient flexure, have superior strength, and have relatively low torsional rigidity for low control forces.

While the preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. In a helicopter rotor blade system yoke, a feathering flexure comprising, in transverse cross section:

a thin central web;

at least two flanges extending from each of at least two separated points on said web, said flanges lying substantially in planes which are approximately radial relative to a neutral feathering axis of said feathering flexure; and each said flange comprising two belts constructed of unidirectional composite material and a bias pack constructed of bias composite material, said belts being disposed on opposite sides of said bias pack and tapering inwardly toward said bias pack adjacent to an intersection of said flange and said web.

2. An integral yoke for a helicopter rotor blade system comprising:

a hub, a flapping flexure, an inboard transition section, a feathering flexure, an outboard transition section, and an outboard joint;

said flapping flexure extending from said hub and having a substantially rectangular transverse cross section;

said inboard transition section extending from said flapping flexure, having an inboard end whose transverse cross section is substantially identical to that of an outboard end of said flapping flexure, and having an outboard end whose transverse cross section is substantially identical to that of an inboard end of said feathering flexure;

said feathering flexure extending from said inboard transition section and having a transverse cross section characterized by a thin central web and at least two flanges extending from each of a least two separated points on said web, said flanges lying substantially in planes which are approximately radial relative to a neutral feathering axis of said feathering flexure;

each said flange comprising two belts constructed of unidirectional composite material and a bias pack constructed of bias composite material, said belts being disposed on opposite sides of said bias pack and tapering inwardly toward said bias pack adjacent to an intersection of said flange and said web; and said outboard transition section extending from said feathering flexure, having an inboard end whose transverse cross section is substantially identical to that of an outboard end of said feathering flexure, and having an outboard end whose transverse cross section is substantially identical to that of an inboard end of said outboard joint.

3. In a helicopter rotor blade system yoke, a feathering flexure comprising, in transverse cross section:

a thin central web;

at least two flanges extending from each of at least two separated points on said web, said flanges lying substantially in planes which are approximately radial relative to a neutral feathering axis of said feathering flexure; and a portion of at least one flange adjacent to each of said points on said web being oriented substantially at 90 degrees relative to said web.

* * * * *

UNITED STATES PATENT AND TRADEMARK OFFICE
CERTIFICATE OF CORRECTION

PATENT NO. : 5,358,381                            Page 1 of 2
DATED : October 25, 1994
INVENTOR(S) : Cecil E. Covington, et al It is certified that error appears in the above-indentified patent and that said Letters Patent is hereby corrected as shown below:

The title page, should be deleted to be replaced with the attached title page.

Signed and Sealed this

Twenty-eight Day of February, 1995

Attest:

BRUCE LEHMAN

Attesting Officer                   Commissioner of Patents and Trademarks

United States Patent [19]
Covington et al.

[11] Patent Number: 5,358,381
[45] Date of Patent: Oct. 25, 1994

[54] YOKE FOR HELICOPTER ROTOR SYSTEMS

[75] Inventors: Cecil E. Covington, Hurst; Timothy K. Ledbetter, Euless; Ernest A. Powell, Bedford; Madison K. Robinson, Bedford; Ajay Sehgal, Bedford; Patrick R. Tisdale, Roanoke, all of Tex.

[73] Assignee: Bell Helicopter Textron Inc., Fort Worth, Tex.

[21] Appl. No.: 34,345

[22] Filed: Mar. 19, 1993

[51] Int. Cl.5 ............................................. B64C 27/38
[52] U.S. Cl. ............................................. 416/134 A
[58] Field of Search ............ 416/134 A, 136 A, 140 A

[56] References Cited

U.S. PATENT DOCUMENTS

| | | | |
|---|---|---|---|
| 3,261,407 | 7/1966 | Culver et al. | 416/134 A |
| 3,519,260 | 7/1970 | Irwin | 416/134 A |
| 4,352,631 | 10/1982 | Buchs et al. | 416/134 A |
| 4,650,401 | 3/1987 | Yao et al. | 416/134 A |
| 4,892,461 | 1/1990 | Matsumoto et al. | 416/134 A |
| 4,898,515 | 2/1990 | Beno et al. | 416/134 A |

Primary Examiner—Edward K. Look
Assistant Examiner—Mark Sgantzos
Attorney, Agent, or Firm—John M. Cone; William L. Clayborn

[57] ABSTRACT

An improved feathering flexure for a helicopter rotor system yoke includes, in transverse cross section, a relatively thin central web and six relatively thin flanges. Three flanges extend from each of the web's two edges, and the flanges lie in planes which are approximately radial relative to the neutral feathering axis of the feathering flexure. The feathering flexure is constructed of fiberglass material embedded in a polymer matrix. The web's fiberglass material in the web is bias material, that is, material whose glass fibers are oriented at plus or minus 45 degrees relative to the yoke's spanwise axis. In transverse cross section, each of the flanges includes two unidirectional belts disposed on either side of a bias pack. The glass fibers in the unidirectional belts are oriented parallel to the yoke's spanwise axis. The fiberglass material in the bias packs is bias material. Each flange's unidirectional belts taper inwardly toward its bias pack adjacent to web, thereby decreasing the thickness of the flange adjacent to the web. In addition, the portion of each flange adjacent to the web is configured to minimize torsional rigidity and shear stress resulting from twisting the feathering flexure.

3 Claims, 4 Drawing Sheets